(12) United States Patent
Pyk

(10) Patent No.: US 8,423,697 B2  
(45) Date of Patent: Apr. 16, 2013

(54) DEVICE INTERFACE MODULE

(75) Inventor: Magnus Pyk, Fullerton, CA (US)

(73) Assignee: American Reliance, Inc., El Monte, CA (US)

(*) Notice: Subject to any disclaimer, the term of this patent is extended or adjusted under 35 U.S.C. 154(b) by 0 days.

(21) Appl. No.: 12/422,053

(22) Filed: Apr. 10, 2009

(65) Prior Publication Data

US 2009/0271552 A1    Oct. 29, 2009

Related U.S. Application Data

(60) Provisional application No. 61/047,652, filed on Apr. 24, 2008.

(51) Int. Cl.
| | |
|---|---|
| H05K 7/10 | (2006.01) |
| G06F 13/00 | (2006.01) |
| G06F 1/16 | (2006.01) |

(52) U.S. Cl.
USPC .......... 710/302; 700/300; 700/301; 700/302; 361/679.02; 361/679.32; 361/679.61

(58) Field of Classification Search .......... 710/300–304; 361/679.01–679.61
See application file for complete search history.

(56) References Cited

U.S. PATENT DOCUMENTS

| 5,278,730 A * | 1/1994 | Kikinis .................... 361/679.32 |
| 5,600,800 A * | 2/1997 | Kikinis et al. ................. 710/303 |
| 5,628,055 A * | 5/1997 | Stein .......................... 455/575.1 |
| 5,752,082 A * | 5/1998 | Staples ........................... 710/62 |
| 5,867,406 A * | 2/1999 | Yanagisawa .................. 708/140 |
| 5,887,145 A * | 3/1999 | Harari et al. .................. 710/301 |
| 5,999,952 A * | 12/1999 | Jenkins et al. ................ 708/100 |
| 6,029,183 A * | 2/2000 | Jenkins et al. ................ 708/100 |
| 6,133,884 A * | 10/2000 | Talvitie et al. ................ 343/702 |
| 6,215,656 B1* | 4/2001 | O'Neal et al. ........... 361/679.02 |
| 6,307,745 B1* | 10/2001 | Liebenow ............... 361/679.55 |
| 6,377,218 B1* | 4/2002 | Nelson et al. ................. 343/702 |
| 6,434,643 B1* | 8/2002 | Ejiri ............................. 710/58 |
| 6,438,638 B1* | 8/2002 | Jones et al. .................... 710/301 |
| 6,516,053 B1* | 2/2003 | Ryan et al. ..................... 379/21 |
| 6,516,374 B1* | 2/2003 | Kinoshita et al. ............ 710/304 |
| 6,525,932 B1* | 2/2003 | Ohnishi et al. ........... 361/679.41 |
| 6,574,102 B2* | 6/2003 | Usui et al. ................ 361/679.48 |
| 6,583,982 B2* | 6/2003 | Mancini et al. .......... 361/679.03 |
| 6,594,721 B1* | 7/2003 | Sakarda et al. ............... 710/304 |
| 6,687,778 B2* | 2/2004 | Ito et al. ........................ 710/301 |
| 6,757,269 B2* | 6/2004 | Dorenbosch et al. ......... 370/338 |
| 6,804,541 B1* | 10/2004 | Muramatsu et al. .......... 455/573 |
| 6,809,721 B2* | 10/2004 | Love ............................. 345/161 |
| 6,826,638 B1* | 11/2004 | Jaggers et al. ................. 710/300 |

(Continued)

OTHER PUBLICATIONS

PCI Local Bus "Mini PCI Specification Revision 1.0"—Dated Oct. 25, 1999; 82 pages.*

(Continued)

*Primary Examiner* — Brian Misiura  
(74) *Attorney, Agent, or Firm* — Haynes and Boone LLP

(57) ABSTRACT

A computer, such as a portable computer, can include a removable interface module. The module can contain a device having a computer interface. The device can be a radio or a fiber optic communications device, for example. The use of such a module can facilitate repair and reconfiguration of the portable computer in the field. Such computers can be used by military personnel, police, emergency medical personnel, fire fighters, and the like.

5 Claims, 6 Drawing Sheets

U.S. PATENT DOCUMENTS

| | | | |
|---|---|---|---|
| 6,963,939 B2* | 11/2005 | Stryker et al. | 710/104 |
| 6,963,943 B2* | 11/2005 | Wakely et al. | 710/302 |
| 7,146,446 B2* | 12/2006 | Chu | 710/301 |
| 7,171,503 B2* | 1/2007 | Lee et al. | 710/300 |
| 7,254,015 B2* | 8/2007 | Yin et al. | 361/679.55 |
| 7,415,562 B2* | 8/2008 | Chen et al. | 710/300 |
| 7,634,650 B1* | 12/2009 | Shah et al. | 713/150 |
| 7,653,009 B2* | 1/2010 | Watsen et al. | 370/254 |
| 7,707,407 B2* | 4/2010 | Anspach | 713/160 |
| 2004/0201952 A1* | 10/2004 | Lin | 361/679 |
| 2005/0185364 A1* | 8/2005 | Bell et al. | 361/679 |
| 2006/0236015 A1* | 10/2006 | Tsuji | 710/303 |
| 2006/0248252 A1* | 11/2006 | Kharwa | 710/303 |
| 2008/0065805 A1* | 3/2008 | Wu et al. | 710/301 |
| 2008/0189556 A1* | 8/2008 | Modica et al. | 713/192 |
| 2008/0244216 A1* | 10/2008 | Zilavy | 711/173 |

OTHER PUBLICATIONS

"IEEE 802.11b/g Wireless LAN USB Adapter w/ Ext. Antenna" User's Manual Version 2.0—Dated May 8, 2007; 33 pages.*

Allied Telesyn—"AT-2801FX Fast Ethernet PCMCIA Fiber Adapter Card"—Dated 2005; 2 pages.*

Cisco Systems—"Cisco Aironet 350 Series Client Adapters"—Dated 2003; 10 pages.*

IMATION—"SuperDisk Technology"—Dated Jul. 22-23, 1998; 40 pages.*

Netgate—"MMCX to RP-TNC Panel Mount Pigtail 18", 6 GHz—Dated May 29, 2003; 2 pages.*

"The ExpressCard Standard—The Next Generation PC Card Technology"—4 pages; Dated Oct. 2003.*

AMREL—"Common Control, Here & Now"; 12 pages, No Date Provided.*

AMREL—"Rocky RT9-M—Fully Rugged Laptop Product Sheet"; 2 pages, No Date Provided.*

Advantech—"PCA-6186-B Socket 478 Pentium 4/Celeron D/Celeron Processor Card with VGA/Dual GbE LAN"; 1 page, Mar. 1, 2007.*

Commell—"LV-676 Mini-ITX motherboard User's Manual Edition: 1.00"; 60 pages, Mar. 27, 2007.*

"ExpressCard Standard—Release 1.1"; 105 pages, Dated Feb. 2006.*

Wikipedia Entry—"Conventional PCI"; 28 pages, Retrieved May 8, 2012.*

Intel—"Product Brief—Intel 82551QM Fast Ethernet Multifunction PCI/CardBus Controller"; 2 pages, Dated 2004.*

"RouterBOARD 200 Series User'S Manual Rev. Q"; 19 pages, Nov. 22, 2005.*

* cited by examiner dimensions thereof, according to an example of an embodiment.

DEVICE INTERFACE MODULE

PRIORITY CLAIM

This patent application claims the benefit of the priority date of U.S. provisional patent application Ser. No. 61/047,652, filed on Apr. 24, 2008 and entitled MINI PCI DEVICE INTERFACE MODULE pursuant to 35 USC 119. The entire contents of this provisional patent application are hereby expressly incorporated by reference.

TECHNICAL FIELD

The present invention relates generally to computers. The present invention relates more particularly, for example, to methods and systems for hot swapping devices, such as radios and optical fiber communications devices, in a computer.

BACKGROUND

Computers for use in field environments are well known. For example, computers are commonly used by military personnel, police, emergency medical personnel, and fire fighters.

The demand upon such computers can be severe. Such computers are frequently subject to rough handling because they are used in battlefield and emergency situations. Such computers are frequently subject harsh environments such as extreme hot and cold, as well as humidity and rain. Such field computers must function reliably in spite of rough handling and harsh environments. The failure of such computers can result in loss of property and even loss of life.

In many instances, it is desirable to reconfigure or repair a computer in the field. Such reconfiguration can facilitate enhanced use or different use of the computer. The ability to reconfigure a computer in the field can substantially reduce the total number of such computers required. Instead of a separate, dedicated computer for each use, a single computer can perform a wide variety of functions. Increasing the functionality of such field portable computers reduces inventory, lowers costs, and simplifies logistics.

As such, the use of in-field and hot swappable devices for such computers is desirable.

BRIEF SUMMARY

Methods and systems for in-field and hot swapping of computer components, devices, or subsystems are disclosed herein. In accordance with an example of an embodiment, field portable computers suitable for use by military personnel, police, emergency medical personnel, and fire fighters are provided. Such computers are sufficiently rugged so as to operate reliably when subjected to rough handling and harsh environments.

In accordance with an example of an embodiment, a module can be sealed, in-field swappable, and hot swappable. The module can have an interface, such as a mini PCI interface, for example. Other types of interfaces, such as USB interfaces, RS232 serial interfaces, RS422 serial interfaces, RS485 serial interfaces, and IEEE 1394 interfaces can likewise be suitable. Indeed, any desired combination of interfaces can be used. The interface(s) can facilitate the electrical connection of various devices to the computer via the module.

In accordance with an example of an embodiment, a computer comprises a removable, sealed, swappable, and hot swappable module. The module can have an interface, such as a mini PCI interface. The module can have any other desired type of interface, as discussed above.

In accordance with an example of an embodiment, a system comprises means for computing and a removable, sealed, in-field swappable, and hot swappable module. The module can have an interface, such as a mini PCI interface. The module can have any other desired type of interface, as discussed above.

In accordance with an example of an embodiment, a method comprises hot swapping a removable, sealed, module. The module can have an interface, such as a mini PCI interface. The module can have any other desired type of interface, as discussed above.

Benefits include increasing the functionality of field portable computers, reduced inventory, lowered costs, and simplified logistics.

Embodiments of the present invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
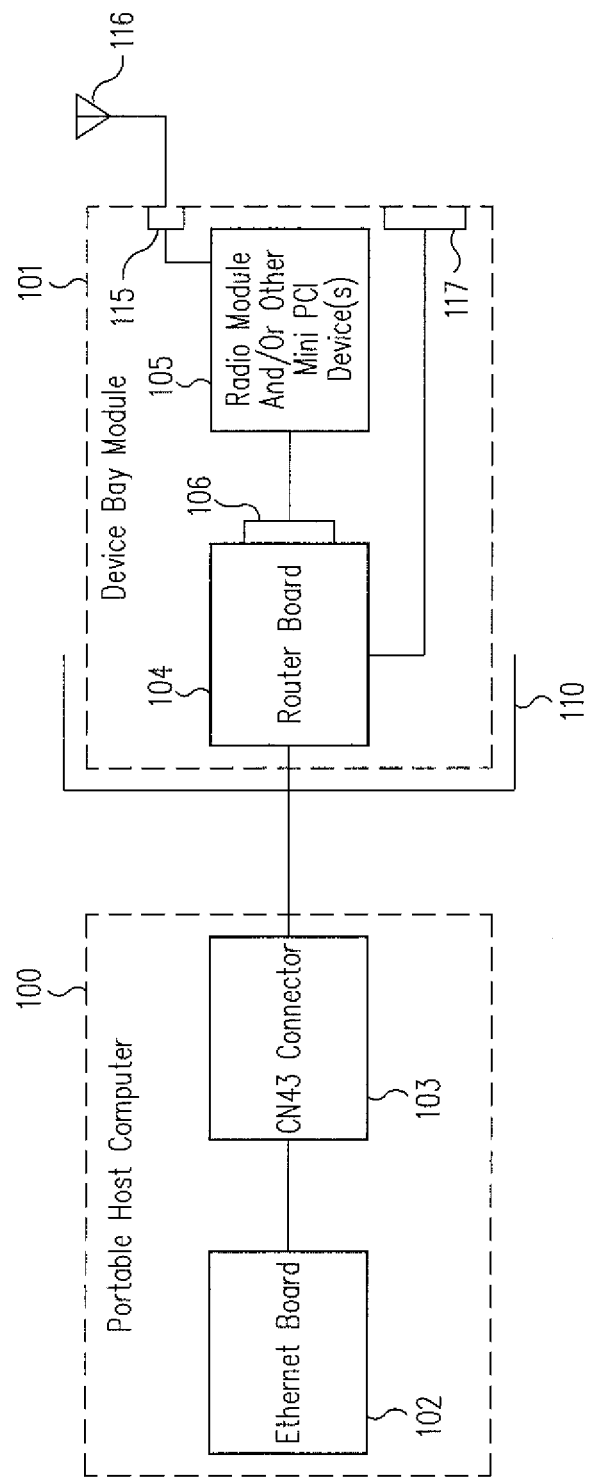
FIG. 1 is a block diagram of a portable host computer and a device bay module, according to an example of an embodiment.

As an example, methods and systems for enhancing the utility of computers, such as portable computers, are disclosed. For example, computers used by military personnel, police, emergency medical personnel, fire fighters, and the like can include a removable module. The use of such a module can facilitate repair and reconfiguration of the portable computer in the field.

The computer can be configured to be carried within or mounted to a vehicle. For example, the computer can be integrated with a military vehicle, a police vehicle, a fire vehicle, a paramedic vehicle, or any other type of vehicle. The computer can be configured to be carried within or mounted to an airborne vehicle, a ground vehicle, and/or a water vehicle.

Thus, computers subjected to rough handling and/or harsh environments can be kept in service for a longer period of time. Further, such computers can be readily reconfigured for used in a variety of different applications.

In accordance with an example of an embodiment, a module is removable, sealed, in-field swappable, and hot swappable. The module can have a computer interface such as a mini PCI interface. The module can have any other desired type of interface, such as such as a USB interface, a RS232 serial interface, a RS422 serial interface, a RS485 serial interface, and IEEE 1394 interface, or any desired combination thereof.

The use of such modules facilitates repair and reconfiguration of the portable computer in the field because other modules can readily be swapped with modules in the computer. That is, if a particular module fails, then another similar module can easily replace the failed module. Similarly, if different functionally is desired, then a module having a different function can replace a module in the computer.

A computer can be configured to receive and/or communicate with any desired number of such modules. For example, a computer can receive and/or communicate with one, two, three, four, five, six, seven, eight, or more modules.

The module can be mounted inside of the computer or can be mounted into or onto a bay or other structure that is not inside of the computer. For example, the modules can be mounted to a bay that is in electrical communication with the computer via a cable. The bay can be inside of or outside of the computer.

Similarly, the modules can be mounted to a bay that is in wireless communication with the computer, such as via Blue-Tooth, WiFi, WiMax, or the like. Such a bay that is in wireless communication with the computer can be either inside of or outside of the computer.

The computer can be a portable computer. Alternatively, the computer can be a non-portable computer. For example, the computer can be mounted to a vehicle, such as an armored transport vehicle, a police vehicle, a fire fighter's vehicle, an ambulance, or the like. Use of the term "portable" herein is by way of example only, and not by way of limitation. The computer can be a general purpose computer or the computer can be a dedicated computer.

Various different types of functionalities can be provided by the module. For example, the module can comprise circuitry for a wireless interface, data acquisition, Ethernet connectivity, fast Ethernet connectivity, a fiber optic interface, a sound card, cryptographic acceleration, an SCSI IDE/ATA controller, a robot controller, and radio controlled (RC) device controller, or any other type of controller or device. The module can comprise circuitry for any desired combination of interfaces or devices. The module can comprise the circuitry for such functionalities and/or can comprise one or more interfaces that facilitate connection of the computer to devices that comprise the circuitry for such functionalities.

The module or components thereof can communicate with the computer via Ethernet and can communicate with devices of the module (whether contained within the module or not) via Ethernet. The module or components thereof can communicate with the computer via any other desired method or protocol and can communicate with devices of the module (whether contained within the module or not) via any other desired method or protocol.

The module can be configured to provide power to module components. The module can be configured to provide power to one or more external devices. For example, the module can be configured to provide power to module components and/or to a radio that is disposed outside of the module. As a further example, the module can be configured to provide power to a radio that is disposed inside of the module.

The module can be configured to receive information from Ethernet or other network circuitry of the computer. For example, the module can comprise a router and the router can be configured to receive information from Ethernet circuitry of the portable computer. The router can have a dedicated processor. The router can have a non-dedicated processor, e.g., a processor that performs other, non-router, functions for the module and/or the computer. The router can have a general purpose processor.

The module can comprise one or more connectors that facilitate the attachment of other components, devices, and/or systems to circuitry of the module and/or to circuitry of the computer. For example, the module can comprise one or more MMCX to TNC antenna connectors. As a further example, the module can comprise one or more fiber optic connectors that facilitate an optical connection to the module and/or the computer.

In accordance with an example of an embodiment, a computer comprises a removable mini PCI device interface module having a sealed, in-field swappable, and hot swappable module. The module can have an interface such as a mini PCI interface or any other desired type of interface or combination of interfaces. The computer can be any desired type of computer.

In accordance with an example of an embodiment, a method comprises hot swapping a removable, sealed, module. The module can have an interface such as a mini PCI interface. The module can be sufficiently rugged that it can be swapped in harsh conditions.

Referring now to FIG. 1, an example of an embodiment is shown wherein a portable host computer 100 has a device bay module 101 disposed with a device bay 110 thereof and electrically connected to the computer 100. An Ethernet circuit 102 of the computer 100 can electrically communicate with a router 104 of the module 101. The Ethernet circuit 102 can be an Ethernet board. The router 104 can be a router board. The Ethernet circuit 102 of the computer 100 can electrically communicate with a router 104 of the module 101 via a CN43 connector, for example. The CN43 connector can facilitate communication between the computer 100 and the module 101. Alternatively, a different connector can be used to facilitate communication between the computer 100 and the module 101.

Thus, an Ethernet board, chipset, or circuit inside the host computer, e.g. on the motherboard of the host computer, can facilitate local area network LAN communication with devices of the module 101. That is, LAN signals can be routed inside the host computer via the Ethernet 102 through the CN43 connector 103 and out to the complimentary docking connector 307 (FIG. 4) of the device bay 110. The router 104 can communicate, via one or more connectors, such as mini PCI connectors 106, which can be located in and/or electrically connected to the host computer device bay 110, with one or more devices 105 that are connected via the mini PCI connectors 106 to the router 104. Using Ethernet or the like, two way communications are thus provided between the host computer 100, the router 104 and a device 105 such as a radio and or fiber optic communication device. The host computer 100 also provides power for the module 101 and/or the devices 105. The host computer 100 provides power for the device bay 110.

The router 104 can facilitate electrical communication between the computer 100 and one or more functional devices 105 of the module 101. For example, the router 104 can facilitate communication between the computer 100 and circuitry for a wireless interface, data acquisition, Ethernet connectivity, fast Ethernet connectivity, a fiber optic interface, a sound card, cryptographic acceleration, an SCSI IDE/ATA controller and/or any other desired device. The router 104 can facilitate communication between the computer 100 and any desired number and/or combination of devices 105.

The devices 105 can communicate with the router 104 via one or more mini PCI interfaces. The devices 105 can communicate with the router 104 via any desired type and/or number of interfaces.

The router 104 can be in electrical communication with one or more connectors, such as mini PCI connectors, to facilitate electrical communication between the computer 100 and devices disposed within the module 101 or electrically connected to the computer through the module 101. For example, the router 104 can be in electrical communication with connectors, such as mini PCI connectors 106 and 117.

The connector, such as the mini PCI connector 106 for example, can be mounted to the router 104, to the module 101, or to both the router 104 and the module 101. Any desired number of PCI connectors 106 or other connectors can be in electrical communication with the router 104.

The mini PCI connector 117 can be disposed inside of the module 101 or can be disposed outside of the module 101, such as on a surface thereof or connected thereto via a cable. The mini PCI connector 106 can thus connect to a device disposed inside of the module 101 or can connect to a device outside of the module 101. And desired number of such PCI connectors and/or other connectors can be used in any desired combination and configuration.

The mini PCI connector 106 can conform to the mini PCI interface specification, as published in the document entitled Mini PCI Specification, Revision 1.0, dated Oct. 25, 1999 and published by the PCI Special Interest Group of Hillsboro, Oreg. Other types of connectors can conform to the applicable specification in a similar manner.

In accordance with an example of an embodiment, the device 105 can comprise a radio module. In such embodiments, a connector 115 can comprise an antenna connector for facilitating electrical communication between the radio module and an antenna, such as external antenna 116.

In accordance with an example of an embodiment, the device 105 can comprise an optical communications module. In such embodiments, a connector 115 can comprise a fiber optic connector for facilitating optical communication between the optical communications module and optical fiber.

Figure 2:
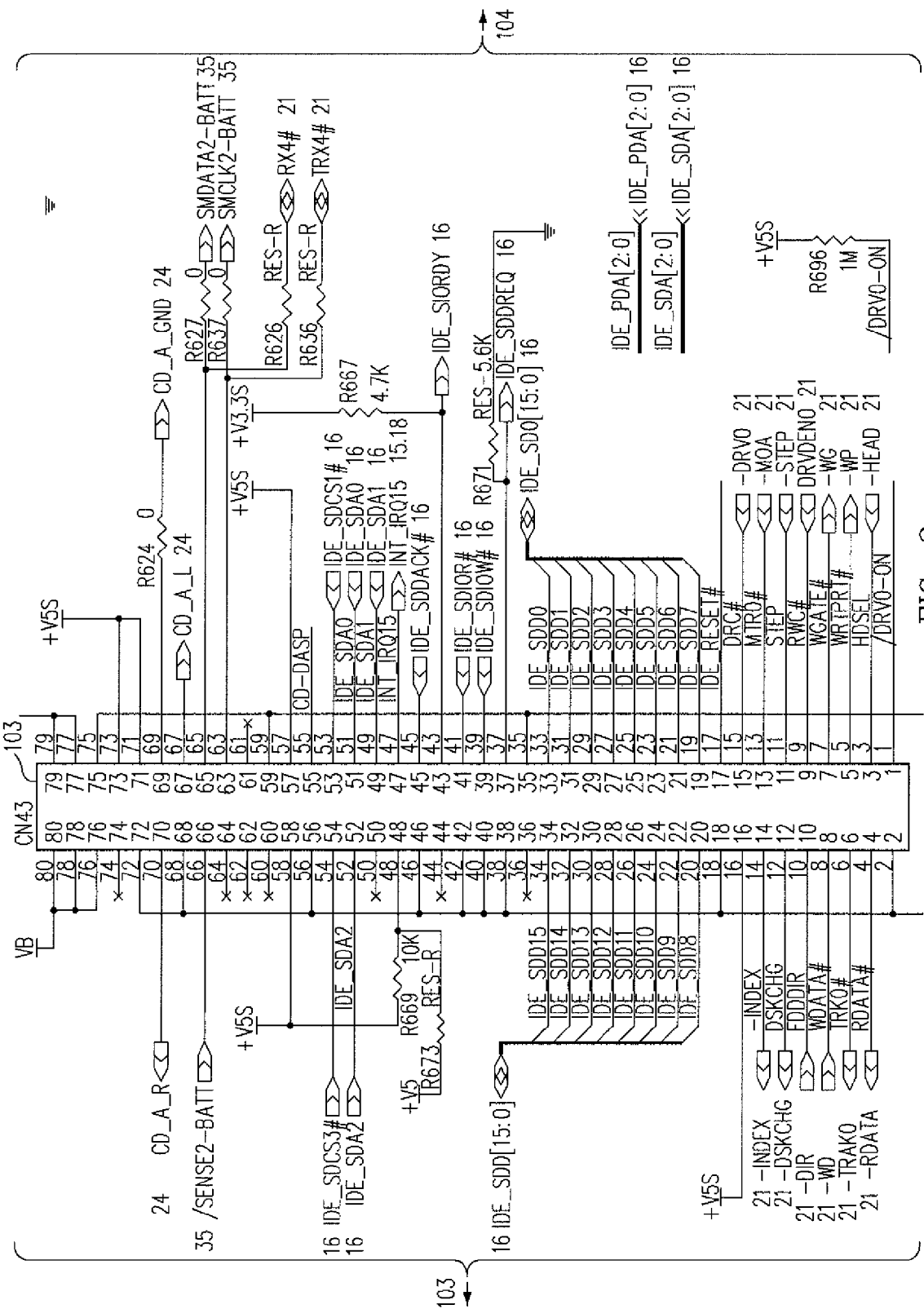
FIG. 2 is a schematic showing the pin out and signals associated with a local area network (LAN) connector of the host computer and showing the pin out and signals associated with the device bay connector of the host computer, according to an example of an embodiment.

Referring now to FIG. 2, the CN43 connector 103 can have a pin out as shown. The CN43 connector 103 can further be connected as shown in the following table:

| | |
|---|---|
| Pin 80 (+76, 78) | 12 V |
| Pin 73 | 5 V |
| Pin 61 | LAN Pin 3 |
| Pin 63 | LAN Pin 2 |
| Pin 65 | LAN Pin 1 |
| Pin 66 | LAN Pin 6 |
| Pin 2 | Ground |

Pins 1,2,3,6 are from the LAN connector in the host computer and Pins 65,63,61,66 are in the CN43 connector 103 in the host computer.

Figure 3:
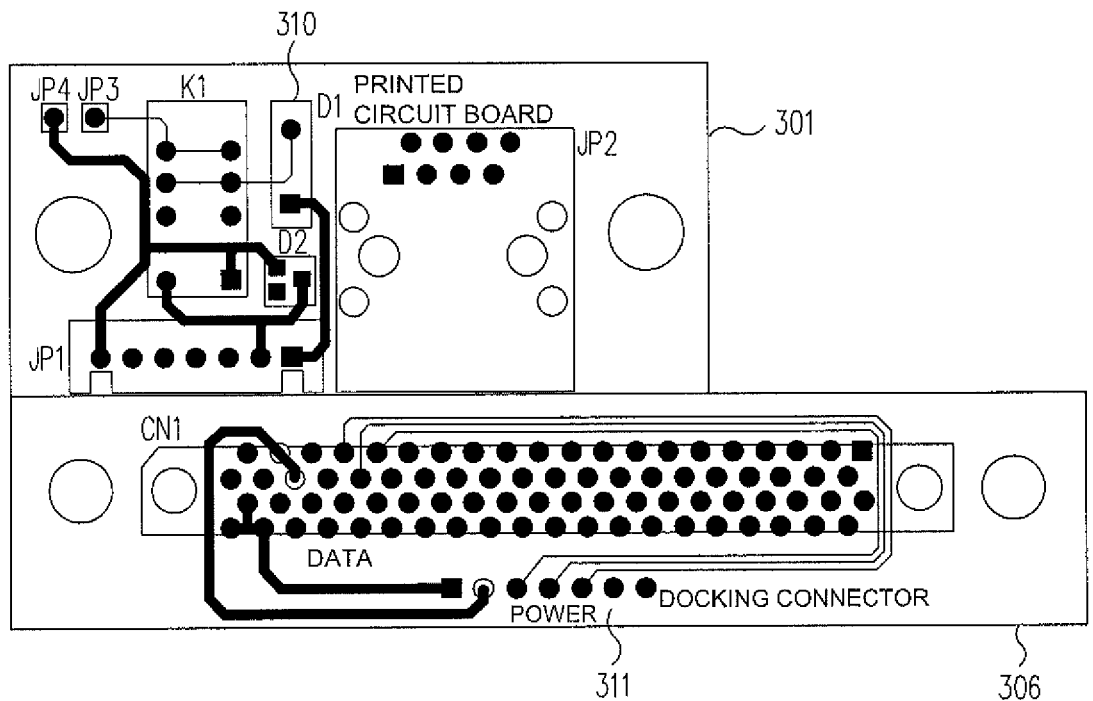
FIG. 3 is a semi-schematic front view of the LAN device bay connector, as well as the circuit board associated with the connector, according to an example of an embodiment.
Figure 4:
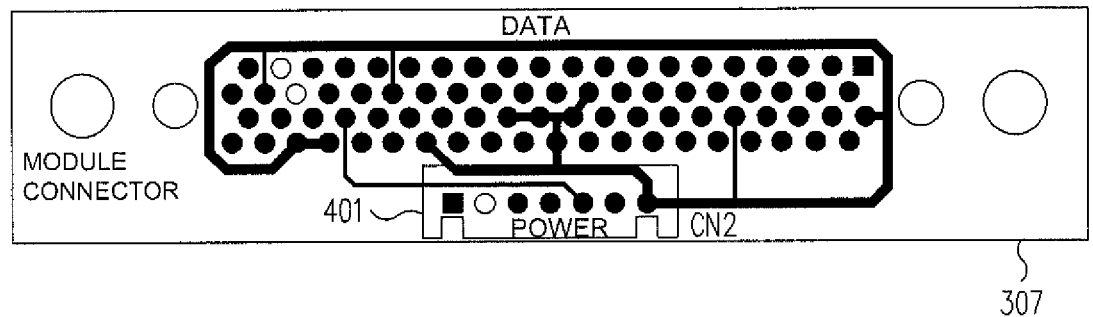
FIG. 4 is semi-schematic front view of the LAN connector and device connector, according to an example of an embodiment.

Referring now to FIGS. 3 and 4, an example of an embodiment has a router 104 (FIG. 1) mounted inside the device bay module 110 and the router 104 is provided power, control signals and LAN signals from the host computer through a docking connector 306 of the host computer 100. Docking connector 306 can be attached to a printed circuit board 301.

The LAN signals can be routed from JP1 of printed circuit board 301 to JP2 on a power board thereof. From JP2, an Ethernet cable can be used to connect to the router 104. Power can be supplied to the router 104 from JP4 and JP3 via a cable. For example, 5 volts from the host computer is used to turn the power on to the router board when the host computer is started.

LAN signals can be communicated from docking connector 306 to complimentary module connector 307. Module connector 307 can disposed on the module 101 such that sliding module 307 into host computer docking bay 110 (FIG. 1) results in the mating of docking connector 306 and module connector 307.

The power board 301 can have an over-current protection device 310, such as a fuse or circuit breaker 3, that is configured to protect the router 104 and any devices, such as radio 105, from power malfunctions.

The computer's primary power system can be any desired power system. For example, the computer's primary power system can be a built-in battery, an external battery, a vehicles power system (e.g., a vehicle battery, alternator, and/or generator), facility power, or any other power source.

A power connector 401 can be part of the mini PCI connector 307 so as to receive power of a complimentary power connector 311 of the host computer docking connector 306. The power connector 401 can provide power to one or more devices 105 within the module 101 and/or one or more devices outside of the module 101.

Figure 5:
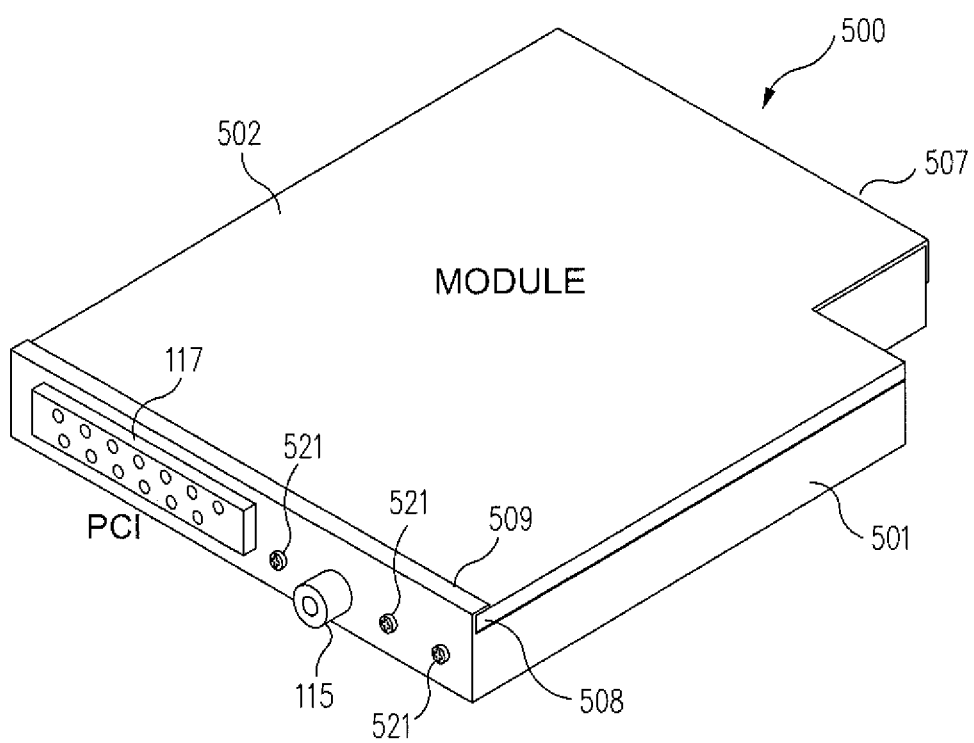
FIG. 5 is a perspective view of the module, according to an example of an embodiment.

Referring now to FIG. 5, an example of an embodiment is shown wherein a sealed, modular, removable, hot swappable mini PCI interface is enclosed within an enclosure 500. The enclosure 500 can comprise a base 501 and a cover 502. The enclosure 500 can contain and/or generally define the module 101.

The cover 502 can attach to the base 501, such as via the use of fasteners. For example, one end 508 of the cover 502 can slide under a lip 509 of the base 501 and be captured thereby. The other end 507 of the cover 502 can attach to the base 501 via a screw that passes through unthreaded hole 510 (FIG. 6) of the cover 502 and into threaded hole 511 of base 501. The cover 502 can attach to the base 501 via any other desired method.

The enclosure 500 can be sealed so as to inhibit the undesirable introduction of contaminants (such as soil and moisture) that might interfere with the operation of the circuitry disposed therein. The cover 502 can have a downturned lip 520 formed about the sides and end 507 thereof to facilitate such sealing. The enclosure 500 can be formed of a conductor, such as aluminum or steel, so that electromagnetic shielding is provided thereby. In this way, any devices contained within the enclosure can be shielded from electromagnetic interference, such as electromagnetic interference originating from the computer. Also, the computer can be shielded from electromagnetic interference originating from the module, e.g., from one or more devices contained within the module.

A connector, such as mini PCI connector 117 can be configured so as to facilitate the electrical connection of a device outside of the module 101 to the computer 100 and/or to one or more devices within the module 101. Any desired number of such connectors can be used. Any desired types of such connectors can be used. Similarly, one or more such connectors can be mounted to the enclosure so as to facilitate the electrical connection of one or more devices inside (or outside) of the module 101 to the computer 100. Connector 115 can facilitate the electrical and/or optical connection of an external device (such as antenna 116 or an optical fiber) to circuitry within the module, as discussed above.

Figure 6:
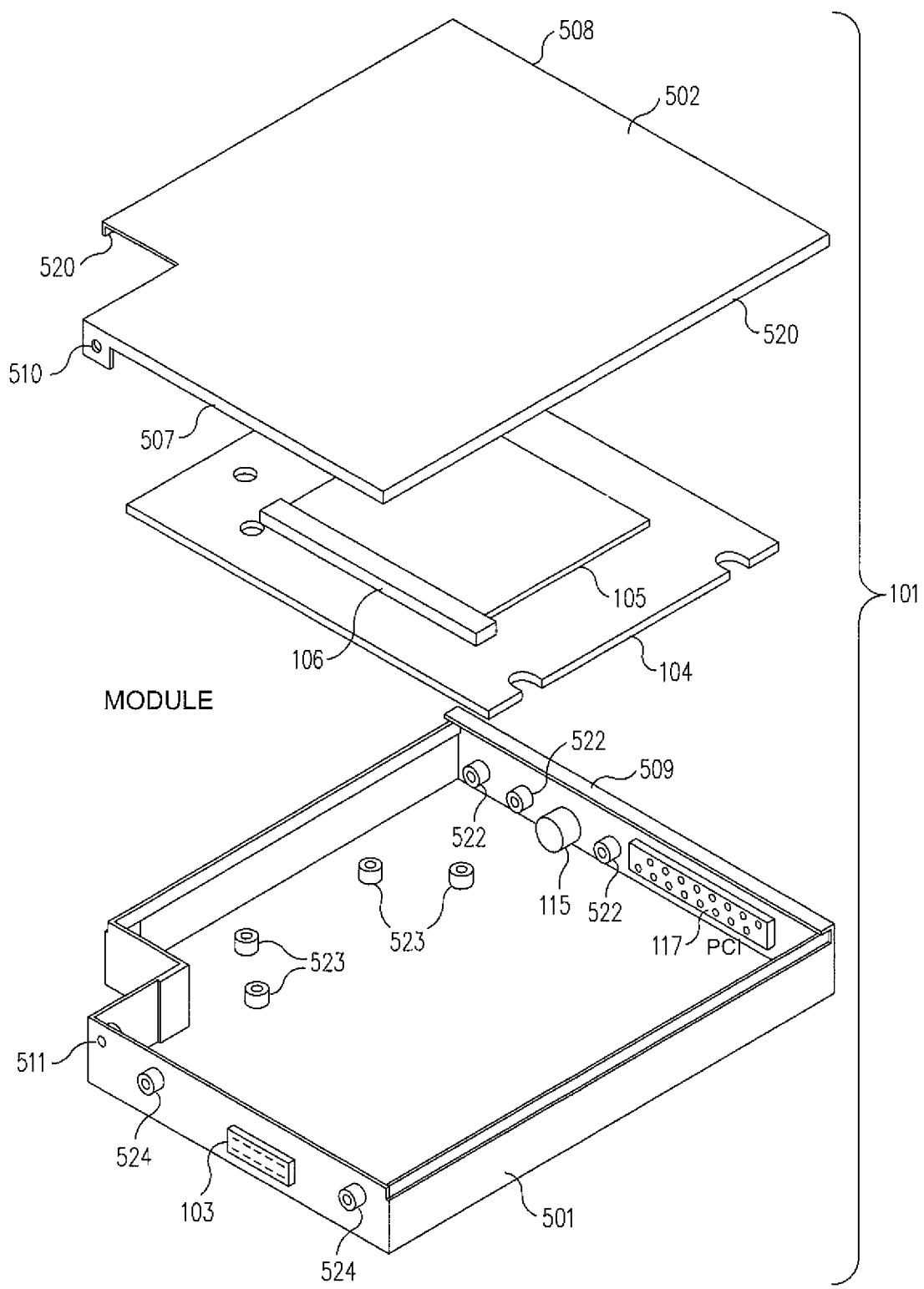
FIG. 6 is an exploded perspective view of the module, according to an example of an embodiment.

Referring now to FIG. 6, the enclosure 500 is shown exploded open. Screws 521 can be received within threaded bosses 522 to attach connectors 115 and 117 to the base 501. The connectors 115 and 117 can be attached to the base 501 by any desired method.

Threaded bosses 523 can facilitate attachment of the router 104 and/or the devices 105 to the base 501. Threaded bosses 524 can facilitate attachment of the module's CN43 connection to the base 501.

Devices 105, such as off the shelf mini PCI interface modules, can be placed in electrical communication with the computer 100 via mini PCI connector 106 and router 104. Such devices can be removed and replaced, e.g., hot swapped, in the field simply by changing the module 101. Such devices can be also removed and replaced by replacing the individual device 105, within the module 101.

Such devices can include wireless interfaces, data acquisition modules, fast Ethernet connectivity, fiber optic interfaces, sound card expansions, cryptographic accelerators, SCSL IDE/ATA, SATA controllers and combination interfaces. Those skilled in the art will appreciate that various other devices are likewise suitable. Indeed, the mini PCI device(s) can be any desired device(s) or combination of devices.

Figure 7:
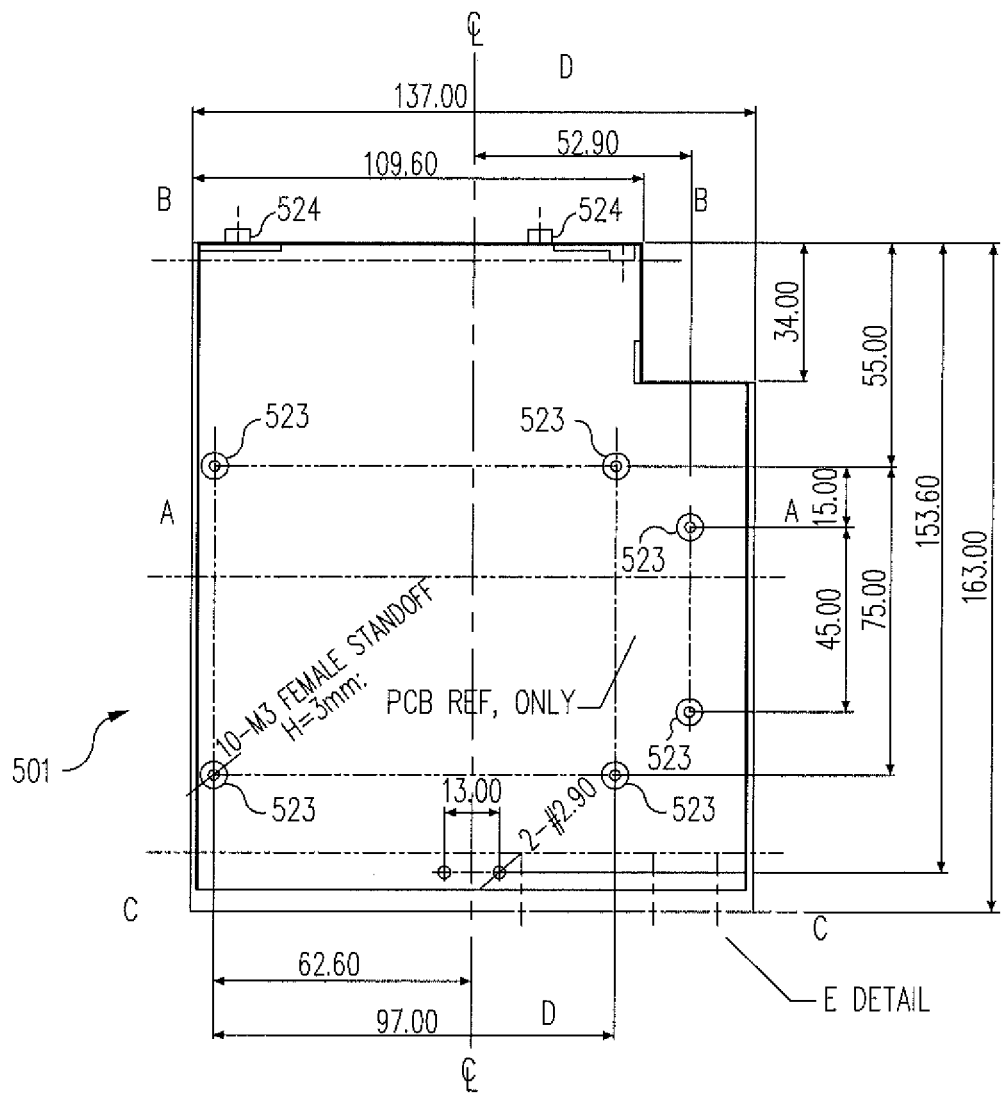
FIG. 7 is a top view of the lower enclosure section of FIGS. 5 and 6, showing dimensions thereof, according to an example of an embodiment.

Referring now to FIG. 7, a plan view of the base 501 is shown with dimensions that conform to those of a standard host computer 100 device bay 110. Those skilled in the art will appreciate that other dimensions are likewise suitable.

In accordance with an example of an embodiment, a removable mini PCI interface has a modular design that provides power and functionality through an integrally packaged component, e.g., the module, of a portable computer. For example, communications between a portable computer and mini PCI interfaces, such as those of radio devices and/or fiber optic communication links, can be facilitated via a hot swappable device bay module.

In this manner, a mini PCI radio, for example, can be easily replaced with a different radio or a radio having a different configuration, simply by replacing the module. For example, a defective radio can easily be replaced with a working radio. As a further example, a good radio can easily be replaced with a different type of radio. Thus, an FM radio can be replaced with a spread spectrum radio, for example. As a further example, a radio having one frequency range can be replaced with a radio having a different frequency range.

Thus, a user can easily exchange a radio for a fiber optic communication device, simply changing a module of the computer. Such a fiber optic communication device can facilitate communication via an optical fiber.

As those skilled in the art will appreciate, such exchanges are often necessary in extremely adverse environments. For example, it may be necessary to exchange a radio for fiber optic communication device on a battlefield, when under file. Of course, such an environment necessitates that the exchange be accomplished with as quickly as possible and with as little effort as possible.

The module can be located in the host computer's device bay and can be protected by the casing of the host computer. This allows the module to be integral to the computer when installed and allows the module to share power with the computer. The elimination of a separate power source, external interfaces and end devices allows the user to travel and manipulate the portable computer and the module as a single device. The module is protected by the computer's device bay slot.

This integration of the mini PCI, an interface and a device into the device bay provides an easily replaceable module, allowing for field repair through modular replacement. This eliminates the need for field training and field technicians to open the computer in the field. In the event a particular device malfunctions in the field the replacement becomes a simple modular exchange that requires little to no training. The module can then be transported to a protected area for repair.

According to an example of an embodiment, an enclosure with a docking connector and power board is provided. The host computer provides power the router board and a device such as a radio and or fiber optic communication device. The device bay turns on when the host computer is powered up. An MMCX to TNC antenna connector can be provided for wireless radio signal transmission and reception. A rubber stand off can be used to electrically isolate the TNC connector from the module enclosure.

Both an antenna connector and a fiber optic connecter can be provided to enhance the flexibility and utility of the module.

The router can have it's own CPU and Ethernet connection. Alternatively, the router can use a non-dedicated CPU and/or Ethernet connection.

One or more embodiments facilitate the ability to change a module from radio or radio control device to a fiber optic or other fixed system control device in the field by providing a swappable bay device for the desired device. One or more embodiments facilitate the ability to control a plurality of different radios in the field. One or more embodiments facilitate the ability to change bands or frequency ranges of a radio. One or more embodiments provide a removable mini PCI device interface module that is configured to provide power and functionality as an integrally packaged component of a portable computer.

Although mini PCI connectors and interfaces are discussed herein, those skilled in the art will appreciate that various other types of connectors and interfaces are likewise suitable. For example, the interface and/or connector can comprise a USB interface/connector, an RS232 serial interface/connector, an RS422 serial interface/connector, an RS485 serial interface/connector, an IEEE 1394 interface/connector and/or any other desired type of interface and/or connector. Thus, discussion of mini PCI connectors and interfaces is by way of example only, and not by way of limitation.

The terms interface and connector can be used interchangeably herein. As used herein portable computers include laptop computers, notebook computers, tablet computers, handheld computers, wearable computers, for example.

The demands upon such computers can be severe. Such computers are frequently subject to rough handling because they are used in battlefield and emergency situations. Such computers are frequently subject harsh environments such as extreme hot and cold, as well as humidity and rain. Such field computers must function reliably in spite of rough handling and harsh environments. Their failure can result in loss of property and life.

In many instances, it is desirable to reconfigure or repair a computer in the field. Such reconfiguration can facilitate enhance used or different use of the computer. The ability to reconfigure a computer in the field can substantially reduce the number of computers required. Instead of a separate, dedicated computer for each use, a single computer can perform a wide variety of functions. Increasing the functionality of such a field portable computer reduces inventory, lowers costs, and simplifies logistics.

Thus, the device interface module can facilitate communication between a computer and a variety of different devices in a manner that facilitates easy removal and replacement of the devices. The devices can be quickly exchanged for other devices, even in harsh or adverse conditions, such as the conditions of a battlefield.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A system comprising:
    a host computer having a device bay;
    an Ethernet board contained within the host computer and configured to route LAN signals inside of the host computer via Ethernet;
    a CN43 connector configured to route the LAN signals out of the host computer to a complimentary docking connector of the device bay;
    a device bay module within the device bay;
    a router board within the device bay module to which the router signals are routed from the complimentary docking connector;
    a mini PCI module within the device bay module to which the router signals are routed from the router board; and
    wherein the LAN signals facilitate communication between the host computer and the mini PCI module.

2. The system as recited in claim 1, wherein the mini PCI module is a radio.

3. The system as recited in claim 1, wherein the CN43 connector has a pin out that includes:
    Pin 80 is 12V;
    Pin 73 is 5V;
    Pin 61 is LAN Pin 3;
    Pin 63 is LAN Pin 2;
    Pin 65 is LAN Pin 1;
    Pin 66 is LAN Pin 6; and
    Pin 2 is Ground.

4. A method comprising:
    routing LAN signals inside of a host computer via Ethernet;
    routing LAN signals through a CN43 connector and out of the host computer to a complimentary docking connector of a device bay;
    routing the LAN signals from the complimentary docking connector to a router board in a device bay module within the device bay;
    routing the LAN signals from the router board to a mini PCI module within the device bay module; and
    wherein the LAN signals facilitate communication between the host computer and the mini PCI module.

5. The method as recited in claim 4, wherein the mini PCI module is a radio.

* * * * *